United States Patent
Ghanbari

[11] Patent Number: 5,916,392
[45] Date of Patent: Jun. 29, 1999

[54] METHOD OF APPLICATION AND COMPOSITION OF COATING FOR BUILDING SURFACES

[76] Inventor: Manouchehr M. Ghanbari, 1 N. Hill Ct., Oakland, Calif. 94618

[21] Appl. No.: 09/059,098

[22] Filed: Apr. 10, 1998

Related U.S. Application Data

[63] Continuation-in-part of application No. 08/796,088, Feb. 5, 1997, abandoned.

[51] Int. Cl.$^6$ .................... E04B 2/00; E04B 2/02; B05D 1/36
[52] U.S. Cl. .................... 156/71; 427/203; 427/403; 427/408; 427/407.3; 29/432.1; 156/332; 156/305; 156/280; 52/745.05; 52/745.06; 52/745.09; 52/745.1; 52/745.13; 52/745.19
[58] Field of Search .................... 427/203, 407.1, 427/407.3, 403, 408; 52/745.19, 745.06, 745.05, 745.09, 745.1, 745.13; 156/72, 71, 41, 42, 332, 305, 280; 29/432.1

[56] References Cited

U.S. PATENT DOCUMENTS

| | | | |
|---|---|---|---|
| 3,044,919 | 7/1962 | Stoneburner | 158/71 |
| 3,860,140 | 1/1975 | Wichman et al. | 220/18 |
| 3,900,620 | 8/1975 | Gilman et al. | 427/408 |
| 4,019,302 | 4/1977 | Meyer | 52/730 |
| 4,049,465 | 9/1977 | Dwyer | 106/314 |
| 4,082,882 | 4/1978 | Weinstein et al. | 428/246 |
| 4,128,519 | 12/1978 | Bartoszek et al. | 280/29.6 NR |
| 4,275,541 | 6/1981 | Orals et al. | 52/483 |
| 4,293,599 | 10/1981 | Hori et al. | 427/274 |
| 4,483,267 | 11/1984 | Seemann, II | 114/357 |
| 4,644,719 | 2/1987 | Salazar | 52/311 |
| 4,721,659 | 1/1988 | Tieckelmann et al. | 428/701 |
| 4,844,964 | 7/1989 | Jurrus | 428/74 |
| 4,942,410 | 7/1990 | Fitch et al. | 346/160.1 |
| 5,041,487 | 8/1991 | Kissel | 524/377 |
| 5,130,184 | 7/1992 | Ellis | 428/245 |
| 5,274,982 | 1/1994 | Price | 52/747 |
| 5,452,553 | 9/1995 | Clapp et al. | 52/408 |
| 5,470,906 | 11/1995 | Craun et al. | 524/507 |
| 5,473,849 | 12/1995 | Jones, Jr. et al. | 52/424 |

*Primary Examiner*—Shrive Beck
*Assistant Examiner*—Michael Barr
*Attorney, Agent, or Firm*—Robert Samuel Smith

[57] ABSTRACT

A method for increasing resistance to damage of a building wall due to wind, water, fire and seismic events including the steps of covering the wall with a fiberglass mat wherein the mat and wall are coated with a prime coat followed by a finish coat laced with cement-sand mixture. Special methods of preparing the base surface of the wall depend on the nature of the wall, be it plywood, gypsum, stucco or concrete. The system is applicable to a vertical wall or floor. Special steps are taken to augment various selected properties of the wall such as increasing shear strength and abrasion resistance.

13 Claims, 1 Drawing Sheet

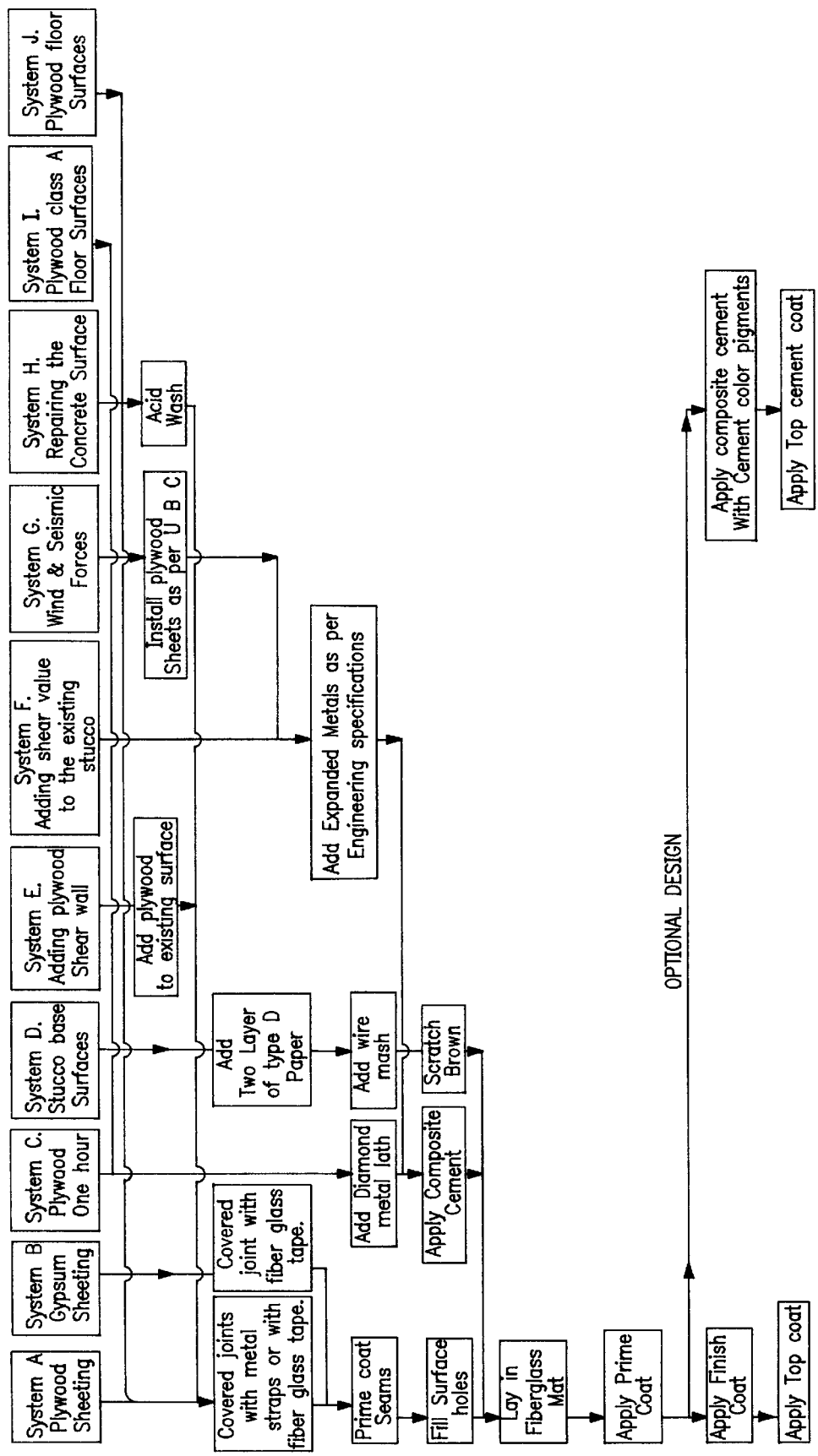

METHOD OF APPLICATION AND COMPOSITION OF COATING FOR BUILDING SURFACES

CROSS REFERENCE TO EARLIER APPLICATIONS

This application is a continuation-in-part of application Ser. No. 08/796,088 filed Feb. 5, 1997 now abandoned from which priority is claimed.

FIELD OF THE INVENTION

This invention relates to applying a exterior finishes to the surfaces of buildings and particularly to a composition and method for applying that enhances the appearance and improves resistance to fire and seismic events.

PRIOR ART AND INFORMATION DISCLOSURE

Long established procedure for constructing a building involves erecting a frame and securing plywood panels to the outside of the frame then applying a "stucco" to the outside surface of the panel. Application of stucco involves tacking tar paper to the outside panel surface, then securing a metal screen over the tar paper. A layer of cement/sand mixture is then trowelled onto the exterior surface where it cures to its final state. This layer, called "scratch coat" may be followed by a second coat (called the "brown coat") and a third coat (called the finish coat. The resultant textured concrete surface can then be painted or covered with a sealer coat.

The stucco finish has been used extensively because it confers durability a degree of fire applied. Other methods have been disclosed for applying exterior surfaces for various applications in construction.

For example, U.S. Pat. No. 4,082,882 to Weinstein discloses a fiberglass reinforced plywood structural sandwich with acrylic facing on one or both sides. The method involves laying an acrylic sheet in a vacuum mold, depositing a resin layer over the exposed surface of the acrylic sheet, laying a glass fiber mat onto the uncured resin surface, laying a sheet of plywood against the resin saturated mat so that the uncured resin wets the plywood. Finally a vacuum hood is forced against the plywood and heat is applied so that all of the layers of the composite form an integral laminated sheet. The sheet is useful for the construction of truck, trailer bodies or intermodular walls.

U.S. Pat. No. 5,130,184 to Ellis discloses a non-combustible thin coating applied as an air-setting paint used to form a coherent fire-barrier between flammable surfaces. The coating may be used alone or in combination with fabrics such as non-woven fabrics to form a transitory heat barrier which, when placed between substrates acts as a fire barrier for the substrate not directly exposed to the flame.

U.S. Pat. No. 5,452,553 to Clapp et al discloses a waterproof roof having special utility for a flat or low pitched roof for a building. The cover is formed by placing a plurality of waterproof sheets loosely over the structural substrate and connecting abutting edges of the sheet. The sheets are thin stiff sheets of resin impregnated fiberglass. The joints between adjacent sheets are formed in situ by applying a mixture of fiber lass and resin to the joints.

U.S. Pat. No. 5,473,849 to Jones discloses a structural wall constructed by casting a core of flowable foam-cement mix between two panels of manufactured exterior grade fiber glass reinforced cement-board. An outer cement board is used as permanent form creating one side of the building wall. The fiber-foam-cement core supplies structural strength, insulating properties and and monolithic bonding for the composite.

Older buildings do not have adequate shear walls to resist seismic and wind forces. Their wall construction generally consist of 2x4 or 2x6 wood studs and 1"x38" wood bat three inch on centers on both sides of the studs. In most cases, stucco is applied to the outside and plaster is applied to the inside of the walls. This system has no shear or very low shear capabilities compared with plywood over the stud wall. A system referred to as "diaphragm" has been developed which is a system of roofs and floors capable of transferring lateral forces to the shear walls or foundation.

The properties of strength, durability, water-proofing, fire resistance, economy of production and pleasing appearance are all properties that are sought after in the construction industry. Any improvement in any of these properties has great value in the market for buildings of all types. As information regarding seismic, fire and weather damage accumulates, new building code standards are continually being written which require modification of existing structures and improvement in present building practices.

A "diaphragm" is a system of roofs and floors capable of transferring lateral forces to the shear walls or foundation.

SUMMARY

It is an object of this invention to apply a method for improving the strength, durability, fire resistant, water repellent and weather resistant properties of surfaces of buildings wherein the buildings may be new constructions or existing surfaces. The surfaces to be so modified include interior and exterior wall and floor surfaces.

This invention is directed toward a method which generally includes the steps of securing a high strength multidirectional fiber glass mat to the surface, applying an acrylic primer coating to saturate the fiber and bond to the structural surface, then applying a finish layer comprising a mixture of sand, cement and polymer. Paint is added to the finish coat as desired. The composition of the prime coat and finish coat, which are major features of this invention, provides that the method of this invention is adaptable to a number of situations. These situations include application to base surfaces of gypsum, plywood, existing concrete and stucco with modifications for enhancing any one or all of fire resistance, increasing shear resistance and as adding protection against seismic events and adverse weather conditions. Modifications adapt the method to repairing or upgrading existing walls or floors.

The finished surface of this invention has all the attractiveness of the concrete, tile, stone slate and stucco look but offers many additional advantages. It is much lighter than stucco and easy to apply yet is structurally stronger. This weight reduction reduces seismic loads significantly. Seismic resistance is further enhanced by the inclusion of expanded metal adding greater strength to the plywood. The multidirectional fiberglass base prevents surface cracking. The acryllic resins are formulated to adhere directly to plywood, gypsum or other surfaces. The 100% water repellant quality ensures that the surface cannot become saturated in damp or rainy weather. It is easy and economical to finish. It is superlight to apply and quick drying (two hours in most cases) and does not crack. Application of the system can be accomplished in one day unlike stucco which generally takes weeks. Cleanup is convenient. Tools are cleaned with water.

BRIEF DESCRIPTION OF THE DRAWING

The FIGURE is a flow chart of the method of the invention.

DESCRIPTION OF A PREFERRED EMBODIMENTS

Turning now to a discussion of drawing, the FIGURE is a flow chart of the method of this invention in its various modifications according to ten different situations. The adaptability of the method to any one of these ten situations resides in the formulation of the prime coat and finish coat, use of various gages of expanded metal, and to the novel use of fiberglass mat. As illustrated in the flow chart, all of the systems A–J use a common prime coat and finish coat and all rely on the use of a fiberglass mat and therefore all of the systems include following the steps within the system "A" for laying in fiberglass and applying prime coat.

The system for practicing this invention generally includes the application of several layers including the prime coat, multidirectional fiber glass mat, finish coat, and, in some applications, a composite of expanded metal and cement coat. A description of these individual layers follows:

I. The multidirectional fiberglass mat secured to the base surface of plywood, gypsum, etc., preferably with staples. The mat is preferably 0.75 oz./ft$^2$ multidirectional high strength chopped fiber glass.

II. The prime coat applied to the mat covered surface such as to saturate the mat and wet the base so that, when the prime coat has cured, the mat will be 100% bonded to the base surface forming a non-floating membrane. The viscosity of the prime coat is adjusted such that the newly applied prime coat will not "run" before it has cured. The prime coat may be applied by brushing, spraying or rolling.

The prime coat material includes (by volume):

A. 70 to 90% Acrylic resin consisting of:
 49–51% acrylic copolymer
 0.2% max concentrated aqueous ammonia
 49–51% Water B. 0.0 to 0.05% Two parts of a coloring agent such as Tamol™ (distributed by Chem Central, Maynard, Calif.);
 one part of an agent for promoting drying without cracking due to shrinkage such as Triton™ (manufactured by Union Carbide);
 0.01 to 0.1 parts of an agent for conferring flexibility and color stability such as Texnal™. (manufactured by Rohm and Haas);

C. 0.02 to 0.05 parts defoamer

D. 10.0 to 20.0 parts Acrylic water base paints.

III. The finish coat is applied over the prime coat and mat and is composed of acrylic polymers and sand mixed in proportions selected to enable that the mixture can be trowelled or sprayed onto the mat/prime coat membrane and cure without sagging even when the surface being coated is perpendicular to provide a coating characterized by desired properties such as resistance to fire, weather, etc. A preferred composition of the finish coat is:

A. An Acrylic resin is formulated consisting of (by volume):
 49–51 parts acrylic copolymer
 0.2 parts max aqueous concentrated ammonia
To 50–75 parts of this Acrylic resin is added:

B. 0.0 to 0.05 parts agent for adjusting drying time and flexibility of the dried coating such as two parts Tamol™, one part Triton™ (by vol) 0.01 to 0.1 Texnal for weather, drying rate, flexibility and color stability C. 0.02 to 0.05 parts defoaming agent D. 25.0 to 50.0 parts Silica sand having a grit size selected from the range 20–60.

E. 4–6 parts porous rock aggregate such as Sponge Rok Moisture™ control, light weight aeration size 23 special to fit the exteriors and interiors of buildings F. 10.0 to 20.0 parts Acrylic water base paint.

Addition of the ammonia in both the primer and the finish cats has been found to be important for improving adhesion of the coatings. The colors are added at the time of application according to a ratio of one gallon of water based acrylic paint to five gallons of finish coat. Unlimited color selection is provided when the paint is added at the time of application.

Texturing can be applied by the users similar to stucco or gypsum wall texturing. A finish coat can be applied by spraying with a hopper gun and/or trowell.

A final top coat may be applied by rolling or brushing (optionally) if desired to provide a durable smooth shiny finish. The top coat is not applied when a flat finish is desired.

IV. In some situations, discussed below a layer of composite cement is applied. The composite cement comprises a cement portion and a binder portion. One gallon of binder ion is added to 50 pounds of cement portion.

The cement portion includes two parts silica sand (20–60 grit) and one part Portland cement (by weight)

The binder portion includes (expressed by volume):

A. 40 to 60 parts Cement modifier consisting of 49–51 parts Acrylic polymer, 0.2 parts concentrated aqueous ammonia solution; water 49 to 51 parts, B. 0.02 to 0.05 parts defoamer C. 40.0 to 60.0 parts water Common situations to which the layers are applied are listed in TABLE I.

TABLE I

System A—Coating application over plywood sheet

System B—Coating application over gypsum sheet

System C—Coating over plywood sheet to provide a "One hour wall" for fire retardance System D—Coating application over a stucco base surface providing a "One hour wall" for fire retardance and preventing surface cracks.

System E—Coating application for adding a plywood shear wall to existing stucco or other surfaces.

System F—Coating application for adding shear strength by adding expanded metals and high strength cement layers and fire resistance ("One hour wall") to existing stucco surfaces.

System G—Coating application for increasing fire resistance and increasing shear and diaphragm load resistance of wind and seismic forces by adding expanded metals to the plywood and covering with high strength concrete System H—Coating application for repairing an existing surface as a finish coat.

System I—Coating application over plywood floor surfaces class A (fire retarding and waterproofing system)

System J—Coating application over plywood floor surfaces for water proofing.

Steps in applying the layers are modified depending on the situation selected from TABLE I, and are presented as follows:

System A Coating Application Over Plywood

1. Surface Preparation: The plywood surfaces must be clean and dry.

2. All plywood joints shall be covered with galvanized metal strap or "2 inch wide" fiberglass self- adhesive tape.

3. Two light coats of prime coat are applied over the metal or fiberglass seams.

4. All holes knots and cuts on the surface are filled with the finish coat.

5. Fiberglass mat cut to fit and hung over the area to be coated with ¼ inch staples. The fiberglass mat is preferably a multidirectional mat having a weight specification of 0.75 oz./ft$^2$.

6. Prime or base coat (mixed with desired acrylic color to a ratio of one gallon of paint to five gallons of prime or base coat is brushed or rolled over the fiber glass mat at an amount of 60–75 square feet per gal. and allowed to dry for at least 2–4 hours depending on the weather. Dry thickness will be 1/16 inches.

7. Finish coat (mixed with desired acrylic color to a ratio of one gallon of paint to five gallons of finish coat) shall be applied to the cured prime (base) coat such as by trowelling and/or spraying to achieve a desired texture. Application of one gallon per 70–85 ft$^2$ provides thickness of about 1/16 inch and requires a drying time of 2–3 hours.

8. Optionally, a top coat may be applied onto the cured textured surface, by an amount of 150–180 ft$^2$/gal. The top coat makes the wall more durable with a smooth shiny finish. Two top coats is recommended.

System B—Coating application over gypsum sheet

The steps in this system are identical to the steps in System A except step 2 which is replaced by:

2. All gypsum sheet joints shall be covered with fiberglass self-adhesive tape, two inches wide.

System C Application to plywood to provide a one hour wall and additional shear strength for resisting wind and seismic forces. The term "one hour wall" is a specification used in construction of buildings ("uniform building code") to characterize the ability of a wall to withstand exposure to heat (fire).

This system is identical to system A except that steps 1–4 are replaced by:

1. Diamond metal lathe (2.5 pound galvanized) is laid over the entire plywood or stucco surface with no overlap.) and stapled in place preferably using stapled one inch wide by 7/8 inches long.

2. The composite cement defined above, is trowelled onto the metal lathe to a thickness of about one pound per ft$^2$.

System D Application over a stucco base system providing a "one hour wall" is the same as system A except that steps 1–4 are replaced by:

1. Apply scratch and brown coat, smooth out as per Lathing and Plastering Institute recommendations which are hereby incorporated as reference in this specification.

System E Application of adding plywood to stucco surface to increase shear strength is identical to system A except that step 1 is preceded by the step:

CDX plywood is attached over the existing siding or stucco using 10d to 16d nails and in such a way that seams of the plywood are aligned with existing studs beneath the stucco paper. Thickness of the plywood is selected according to the required shear value. See UBC table 23-I-k-1 which is hereby incorporated as reference in this specification.

System F Adding shear strength to existing stucco:

1. Add expanded metal as per engineering specifications;

2. Apply composite cement.

3. Lay in fiberglass mat.

4. Apply prime coat.

Optional: Apply composite cement with cement color pigments then apply top cement coat.)

5. Apply finish coat.

6. Apply top coat. Optionally: Apply composite cement with cement color pigments then apply top cement coat in place of steps 5 and 6.

G. Increasing resistance to wind and seismic forces:

1. Install plywood sheets according to the Uniform Building Code.

2. Cover with expanded metal as per Engineering Specifications.

3. Apply composite cement coat.

4. Lay in fiberglass mat.

5. Apply finish coat.

6. Apply top coat. Optionally: Apply composite cement with cement color pigments then apply top cement coat in place of steps 5 and 6.

System H Application for repairing surfaces, enhancing appearance or adding shear strength and fire retardance to a concrete base surface as a finish coat includes the steps:

1. Acid wash and etch the concrete surface. Patch all cracks with patching compounds. A 5% solution (by weight) of sulfuric (or muriatic) acid is preferred for this purpose.

2. Lay fiberglass mat over the area to be covered.

3. Apply prime coat mixed with desired acrylic water base color, one gallon per 65–70 ft$^2$ rolled and brushed in corners over the fiberglass (drying time, 2–4 hrs.).

4. Apply finish coat (mixed with desired acryllic water base color to a ratio of one gallon of paint to five gallons of finish floor coat) trowelled or sprayed with a hopper gun onto cured base coat in the amount of 70–85 ft$^2$ per gallon providing a thickness of about 1/16 inches. Texture is applied with the finish coat.

5. (Optional) Apply composite cement layer finish coat (described above) trowelled on over the prime coat (about one pound per ft$^2$ giving a thickness of 1/8 inches. Apply when temperature is between 45° to 100° F. curing time, 24 hours. If the mixture hardens too fast, add water to reduce hardening rate. After the composite cement layer has completely dried, all surface irregularities may be removed by light scraping, the composite cement coat can be mixed with color pigment or sprayed with color pigment before trowelling. Designs such as grout line can be developed by applying the grout color and taping over prior to applying the finish coat. After the finish coat is applied after two to three hours, depending on the weather, the tape can be carefully lifted off. Apply two coats of additive within two hour of the tape being removed.

6. A top coat may be applied onto the cured textured surface, by an amount of 150–180 ft$^2$/gal. The top coat makes the floor more durable with a smooth shiny finish. Two top coats are recommended.

System I. Applying coating over plywood floor sheet for "class A" fire retardance.

1. Metal lath (2.5 lb.) or expanded metal is laid out over the entire plywood surface (no overlap). and secured with 5/8 inch staples.

2. Composite cement is trowelled into the metal lathe in an amount of one pound per ft.$^2$ making sure all holes are filled to a minimum thickness of 1/8 inch. The mixture can be applied in a temperature range of 45° to 100° F. (curing time, 24 hr.). after the cement layer is completely dried, surface irregularities may be removed by scraping and patching compound may be added as required.

3. Fiberglass mat is laid over the area to be coated by hand while prime coat is applied 60–75 ft² per gallon giving a thickness of 1/16 inch. Drying time is 2–4 hrs.

4. Apply floor finish coat (mixed with desired acryllic water base color to a ratio of one gallon of paint to five gallons of finish floor coat) trowelled or sprayed with a hopper gun onto cured base coat in the amount of 70–85 ft² per gallon providing a thickness of about 1/16 inches. Texture is applied with the finish coat.

5. Apply top coat onto the cured textured finish coat in the amount of 150–180 ft.² per gallon. (Drying time is one hr. or less depending on the weather). Two coats is recommended.

System J. Applying coating over plywood floor sheet:

1. All plywood joints are covered with galvanized metal strap (0.16" thick and 1 inch wide using 5/8 inch long galvanized staples.

2. Two light coats of prime coat are applied over the installed metal sea,s (6–8 inches wide).

3. All knots, holes cuts in the plywood are filled with finish coat.

4. Fiberglass mat (0.75 oz./ft²) is laid over the area and secured with staples.

5. Prime coat mixed with desired acryllic color according to the ratio one part paint to five gallons of base coat is applied over the mat in the amount of 60–75 ft² per gallon giving a coating thickness of 1/16 inches.

6. Apply floor finish coat (mixed with desired acryllic water base color to a ratio of one gallon of paint to five gallons of finish floor coat) trowelled or sprayed with a hopper gun onto cured base coat in the amount of 70–85 ft² per gallon providing a thickness of about 1/16 inches. Texture is applied with the finish coat.

7. Apply top coat onto the cured textured finish coat in the amount of 150–180 ft.² per gallon. (Drying time is one hr. or less depending on the weather). Two coats is recommended.

Versions F and G shear and diaphragm increase the wind and seismic load carrying capacity (allowable forces) by means of adding steel diamond shape sheets (Expanded metal 1/2" to 1 1/2" gage 13 to 9) to the face of the plywood's or existing stucco surfaces. The expanded metal is covered by high strength cement layer and multidirectional fiber glass followed by base and finish coat of the system of this invention.

The coat and method of application of this invention provides tested weather protection at substantial cost savings compared to stucco. Its pleasing appearance remains long beyond the period after which ordinary stucco siding begins to show deterioration. Tests have shown that the applied coat of the present invention does not crack, peel or erode after long exposure. The weight of the applied coat (0.5 lbs./ft²) is much lighter than ordinary stucco (12 to 14 lbs./ft²) providing advantages in seismic design of the building. The high strength of the coating particularly in terms of shear strength and flexibility compared to stucco contributes substantially to seismic resistance of the building.

Water-based acrylic paint available from local paint stores are mixed at the time of application to provide the finish colors without requiring matching colors at the factory.

The exterior finish is far superior to stucco in terms of providing a smoother finish with no cracking. Little or no maintenance is required. Finish color lasts three to four times longer than ordinary stucco colors without fading.

The unique method of application in which openings in the base surface are sealed, prevents repeated callbacks by the installer. It does not require a scratched or brown undercoat as required with ordinary stucco. Application of the coating with a trowel or spray gun is simple and there is no messy job site cleanup afterwards. No stucco mixer or truckloads of sand are required. Waiting around time for curing is substantially reduced.

The surface coated according to the method of the invention may be cleaned by a pressurized water stream which will remove stubborn case of graffiti. In most cases graffiti residues can be washed off with water or, if necessary lightly scrubbed with a bristle brush.

Variations and modifications of the method and compositions of this invention may occur to a reader which are within the scope of the invention. I therefore wish to define the scope of my invention by the appended claims.

What is claimed is:

1. A method for improving resistance of a building having a base surface to damage by water, fire, wind and seismic events which includes, in operable order, the steps:

(a) preparing a prime coating liquid according to the steps
   (A) formulating a first liquid consisting of by volume:
      49–51% acrylic copolymer
      49–51% Water
      0 to 0.2% concentrated aqueous ammonia
   (B) adding to 70 parts by volume of said first liquid:
      0.0 to 0.05 parts by volume an agent for adjusting drying time and flexibility,
      0.02 to 0.05 parts by volume of a defoamer
      10.0 to 30.0 parts by volume of Acrylic water base paints whereby said prime coating liquid is formed (b) preparing a finish coating liquid comprising substantially the composition expressed by volume:
   (A) formulating a second liquid consisting of by volume:
      49–51% acrylic polymer
      49–51% Water
      0.2% concentrated aqueous ammonia
   B. adding to 50–75 parts by volume of said second solution 25.0 to 50.0 parts silica sand having a grit size selected from the range 20 to 60, drying agent in a range of 0.0 to 0.15 parts by volume in an amount selected to provide a desired drying time and flexibility when said finish coating has been applied and allowed to dry; and 0.02 to 0.05 parts of defoaming agent, 10.0 to 20.0 parts by volume of acrylic water base paint.
   C. adding 4 to 6 parts by volume of porous rock aggregate to 100 parts of said mixture of second liquid, silica, drying agent, acrylic base paint and defoaming agent, whereby said finish coating liquid is formed;

(c) providing a multidirectional fiberglass mat having a weight specification of 0.75 oz./ft²;

(d) preparing said base surface to increase adhesion of a prime coat of said prime coat liquid to said base surface when said prime coating liquid is applied to said base surface;

(d) securing said mat to said base surface;

(e) applying said prime coat liquid to said mat and base surface whereby a prime coat is formed when said prime coating liquid cures and said mat is further secured to said base surface;

(f) applying said finish coat liquid over said cured prime coat and permitting said finish coat liquid to cure providing a cured finish coat whereby said method provides base surface of a building having having improved resistance to damage by water, fire, wind and seismic events.

2. The method of claim 1 which comprises the steps:

(g) mixing a top coat liquid;

(h) applying said top coat liquid over said cured finish coat and permitting said top coat to cure.

3. The method of claim 1 wherein said building comprises plywood and said step of preparing includes the steps:

(d.i) cover joints between plywood with metal strap;

(d.ii) applying prime coat liquid over metal strap applied to said joints;

(d.iii) fill in holes in plywood with prime coat liquid and allow prime coat to cure.

4. The method of claim 1 wherein said building comprises one of gypsum and plywood and said step of securing comprises the step of stapling said mat to said base surface.

5. The method of claim 1 wherein said building comprises one of stucco and plywood forming said base surface and said preparing step (d) includes the steps:

(d.i) securing one of metal lathe and expanded metal to said base surface;

(d.ii) covering said lathe secured to said base surface with a layer of a composite cement and allowing said composite cement layer to cure wherein said composite cement includes a cement portion and a binder portion.

6. The method of claim 5 wherein said composite cement comprises:

a cement portion added to a binder portion according to the proportion one gallon of binder portion to cement portion having a range of 30 to 50 pounds;

said cement portion including two parts silica sand having a grit size in a range 20 to 60and one part Portland cement by weight;

said binder portion including by volume:
A 40 to 60% Cement modifier consisting of 49–51% Acrylic polymer, 0–0.2% of concentrated aqueous ammonia solution
B 0.02 to 0.05% defoamer
C 40.0 to 60.0% water.

7. The method of claim 1 wherein said base surface comprises stucco forming said base surface and said preparing step (d) comprises the step of scratching said base surface.

8. The method of claim 1 wherein said building comprises one of plywood and stucco and said step (d) comprises the steps:

(d.i) securing a plurality of non overlapping plywood sheets over said base surface (d.ii) cover joints between said plywood sheets with metal strap;

(d.iii) applying prime coat liquid over metal strap applied to said joints;

(d.iv) fill in holes in plywood with prime coat liquid and allow prime coat to cure.

9. The method of claim 1 wherein said building includes concrete forming said base surface and said preparing step (d) includes the step of washing said base surface with acid.

10. The method of claim 9 wherein said acid is about 5% by weight of one of sulfuric and muriatic acid.

11. The method of claim 1 wherein said building includes concrete forming said base surface and said method comprises the step:

(d.i) washing said base surface with acid; and said method comprises the step (g) applying a composite cement over said cured prime coat.

12. The method of claim 11 wherein said acid is about 5% by weight of one of sulfuric and muriatic acid.

13. The method of claim 11 wherein said composite cement comprises:

a cement portion added to a binder portion according to the proportion one gallon of binder portion to cement portion in a range of 30 to 50 pounds;

said cement portion including two parts silica sand and one part Portland cement by weight wherein said sand has a grit size selected from a range between 20 to 30 grit;

said binder portion including by volume:
A 40 to 60% Cement modifier consisting of 49–51% Acrylic polymer,
B 0–0.2% concentrated aqueous ammonia solution;
C 0.02 to 0.05% defoamer
D 40.0 to 60.0% water.

* * * * *